(No Model.)
A. W. MILES & E. A. COMMANDER.
NUT LOCK.
No. 493,732. Patented Mar. 21, 1893.
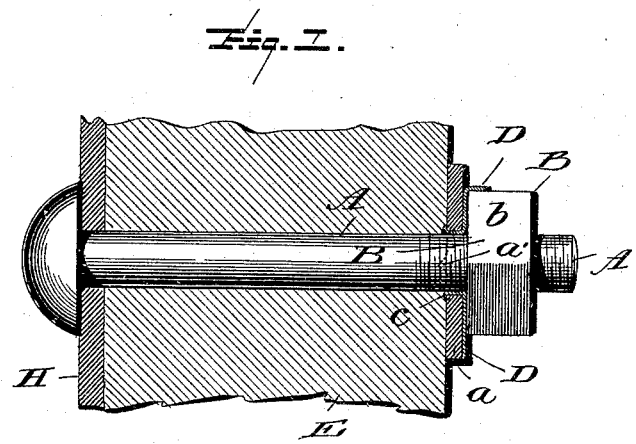
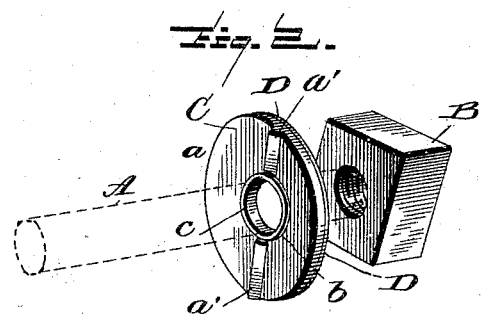
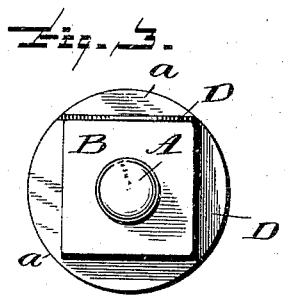
Witnesses
L. C. Hills
E. H. Bond
Inventors:
Arthur W. Miles
Edward A. Commander
by E. B. Stocking, Attorney

UNITED STATES PATENT OFFICE.

ARTHUR W. MILES AND EDWARD A. COMMANDER, OF LIVINGSTON, MONTANA.

NUT-LOCK.

SPECIFICATION forming part of Letters Patent No. 493,732, dated March 21, 1893.

Application filed December 24, 1892. Serial No. 456,237. (No model.)

*To all whom it may concern:*

Be it known that we, ARTHUR W. MILES and EDWARD A. COMMANDER, citizens of the United States, residing at Livingston, in the county of Park, State of Montana, have invented certain new and useful Improvements in Nut-Locks, of which the following is a specification, reference being had therein to the accompanying drawings.

This invention relates to certain new and useful improvements in such devices as nut locks of that class in which a bendable plate or washer is employed, to be bent, or a portion of it, up against one side of the nut to prevent turning thereof, and it has for its objects among others to provide an improved nut lock of this character which will be more efficient, simple in its construction, and not liable to become useless from repeated use. We employ a compound washer, one part being of iron or steel with ribs or prongs or analogous provisions for taking into the wood and the other portion, which may be of brass, or some other suitable bendable metal, or of composition, adapted to be bent against one side of the nut to prevent its turning back when once screwed up on its bolt; this bendable portion of the washer is held to the other portion by being passed through the bolt-opening therein and upset upon the other side or otherwise held. The portion that is located within the opening of the iron part of the washer receives the bolt, and being bendable, permits of slight variation from a straight line or right angle passage through the part which it pierces.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is a section through a timber through which is passed a bolt provided with our improvements, the bolt and nut being shown in elevation and the washer in section. Fig. 2 is a perspective view of the washer and nut with the bolt indicated by dotted lines. Fig. 3 is an end view with a portion of the washer turned up against one side of the nut.

Like letters of reference indicate like parts throughout the several views in which they appear.

Referring now to the details of the drawings by letter, A designates a bolt of known construction and B a nut fitted thereto and also of any suitable form.

C designates our improved washer, which is composed of two parts, the part $a$ being a metallic portion having prongs or ribs $a'$ as seen best in Fig. 2, which however are preferably radial ribs preferably substantially V-shaped in cross section as seen in Fig. 2 and which may extend a greater or less distance from the edge toward the central opening $b$ through which the bolt is designed to pass. This opening is made somewhat larger than the bolt as seen in Figs. 1 and 2, and through this opening is passed the neck $c$ of the other part D of the washer which is of some bendable metal, as brass, and preferably of the same shape and size as the part $a$ as shown; this neck portion extends through the opening in the part $a$ and may or may not be upset upon the inner face thereof; in Fig. 1 it is shown as upset while in Fig. 2 it is not so shown. It may be left as seen in Fig. 2 and upset by the metal or pressed into the wood of the piece through which the bolt passes; it is preferable to upset it so as to keep it in close contact with the part $a$ as the washers are placed upon the market.

In practice, the bolt is passed through the timber or other piece E, a plate or washer H being employed if desired against which the head of the bolt bears as seen in Fig. 1; the washer is then slipped over the other end of the bolt which protrudes through the piece E and then the nut is screwed up; when the latter has been screwed up as far as desired a portion of the bendable portion of the washer is turned up against a side of the nut as seen in Figs. 1 and 3; as the nut is turned up it will force the prongs or ribs of the portion $a$ of the washer into the piece E as indicated by dotted lines in Fig. 1 and thus prevents turning of the said part.

The advantages of the construction above described will be readily appreciated and its simplicity will recommend it for use in any and all places where such devices are applicable.

The washer may be made of any desired size or shape and the bendable portion may be of any suitable material.

What we claim as new is—

1. A washer composed of a rigid part with bolt opening, and a part of bendable material having a neck portion passed through the opening in the rigid part and upset into locking engagement therewith, substantially as specified.

2. The combination with a bolt and a nut, of a compound washer formed of a part with a bolt opening of greater diameter than the bolt and a bendable part having a bolt opening and a portion extending within the bolt opening of the first mentioned part and held thereto and surrounding the bolt, substantially as specified.

3. The combination with a bolt and a nut, of a compound washer composed of a part with radial ribs and a bolt opening of greater diameter than the bolt and a bendable part having a bolt opening and a portion extending within the bolt opening of the first mentioned part and surrounding the bolt and upset against the underside of the first-mentioned part, substantially as described.

In testimony whereof we affix our signatures in presence of two witnesses.

ARTHUR W. MILES.
EDWARD A. COMMANDER.

Witnesses:
J. H. WOLCOTT,
C. J. SWANSAN.